May 7, 1957  H. H. ENGEMANN  2,791,206
CLEARANCE REGULATOR FOR VALVE OPERATING LINKAGE
Filed Aug. 30, 1952  4 Sheets-Sheet 1
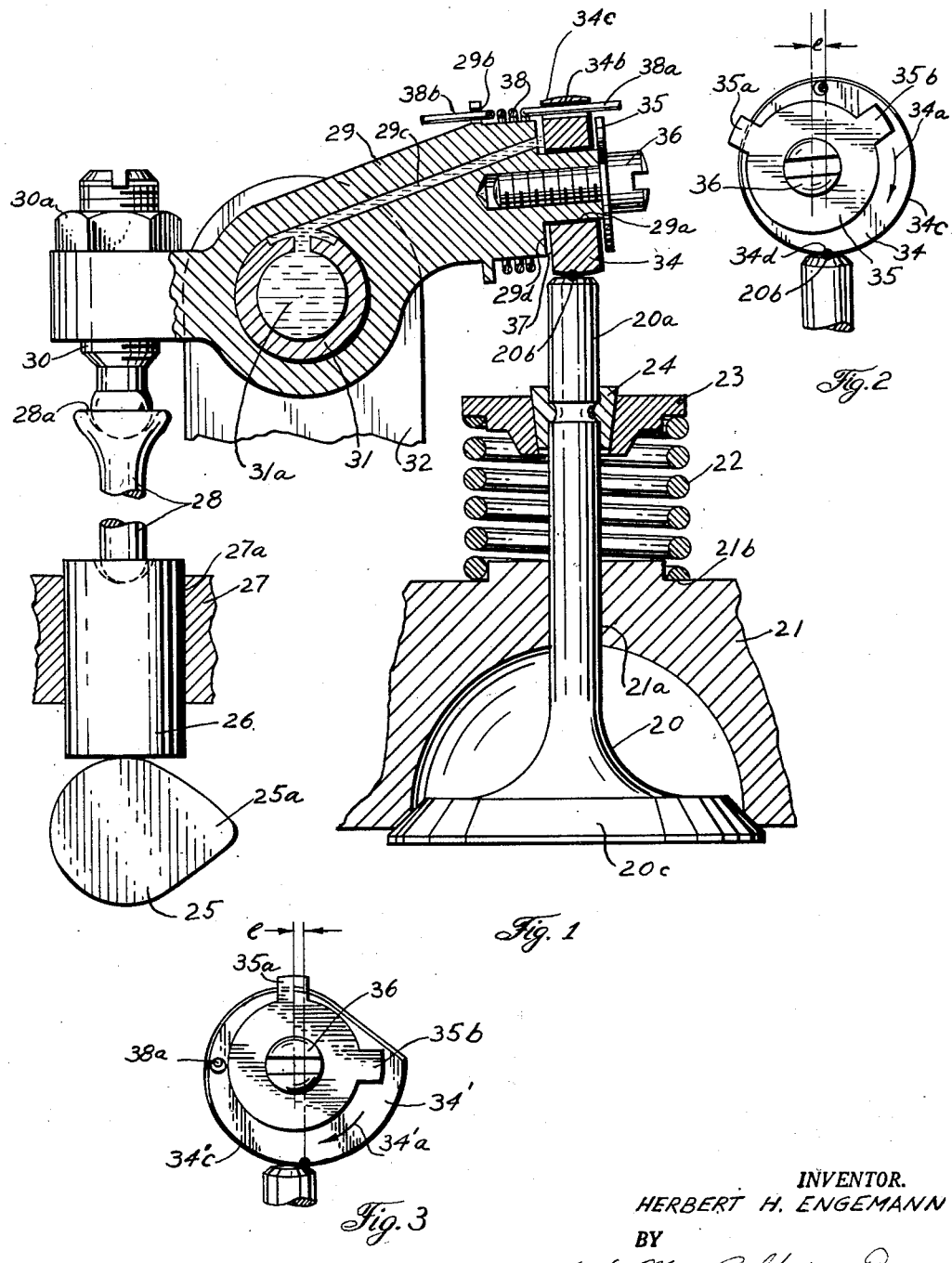
INVENTOR.
HERBERT H. ENGEMANN
BY
Hyde, Meyer, Baldwin & Doran
ATTORNEYS May 7, 1957  H. H. ENGEMANN  2,791,206
CLEARANCE REGULATOR FOR VALVE OPERATING LINKAGE
Filed Aug. 30, 1952  4 Sheets-Sheet 2

INVENTOR.
HERBERT H. ENGEMANN
BY
Hyde, Meyer, Baldwin & Doran
ATTORNEYS

May 7, 1957   H. H. ENGEMANN   2,791,206
CLEARANCE REGULATOR FOR VALVE OPERATING LINKAGE
Filed Aug. 30, 1952   4 Sheets-Sheet 3

INVENTOR.
HERBERT H. ENGEMANN
BY
ATTORNEYS

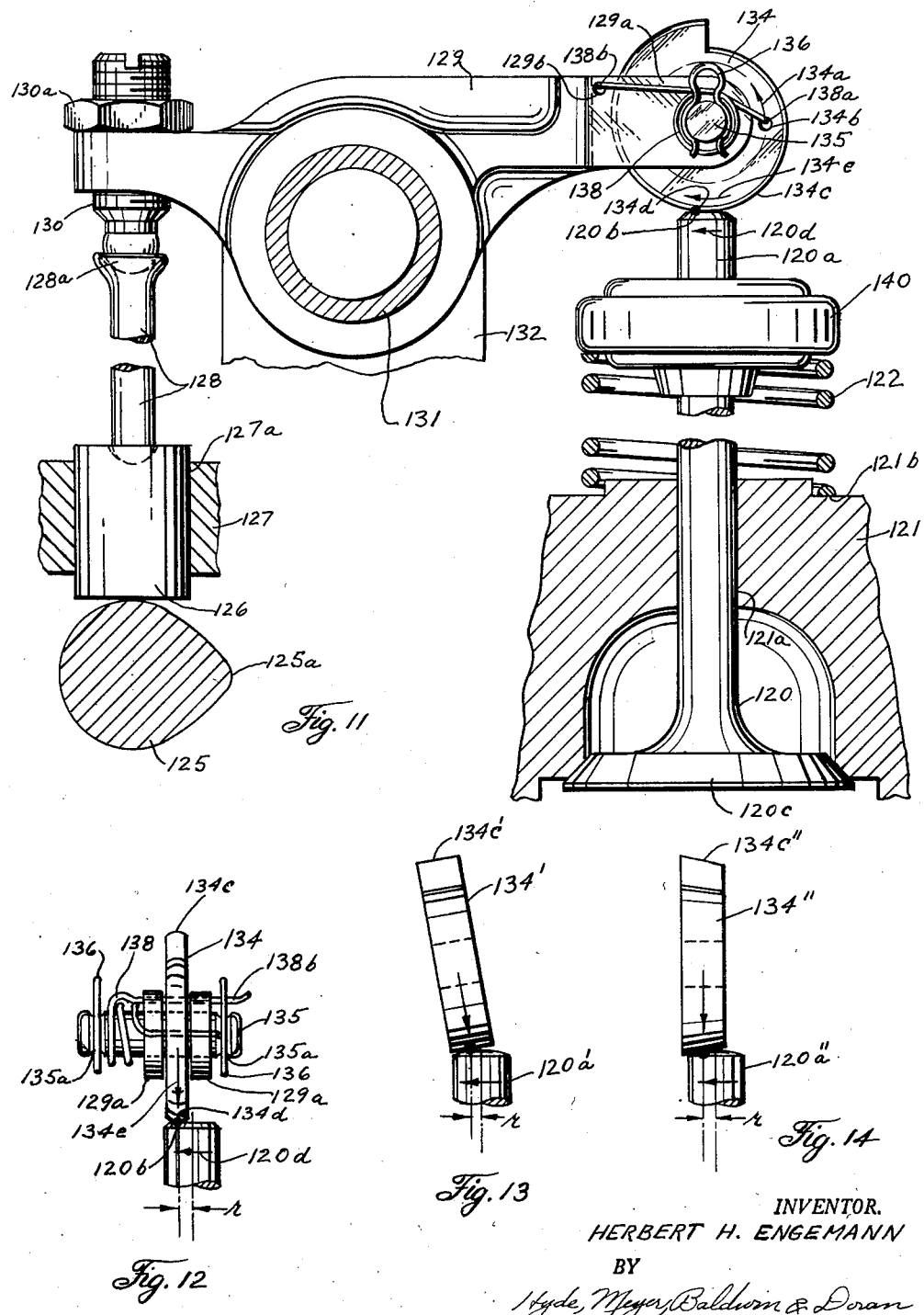

United States Patent Office 2,791,206
Patented May 7, 1957

2,791,206

CLEARANCE REGULATOR FOR VALVE OPERATING LINKAGE

Herbert H. Engemann, Cleveland Heights, Ohio

Application August 30, 1952, Serial No. 307,323

40 Claims. (Cl. 123—90)

This invention relates to improvements in valve operating linkage and more particularly to the clearance regulator in said linkage.

One of the objects of the present invention is to provide a valve clearance regulator with a cam in which the self-shortening action to reduce the effective length of the valve operating linkage is a positive action occurring in each valve operating cycle, is independent of critical friction coefficients, and is independent of the size of the cam self-locking angle.

Another object of the present invention is to provide a valve clearance regulator for regulating the clearance between adjacent, contacting members in the valve operating linkage including a means for shortening or decreasing the effective length of said members when the valve operating force is applied by causing one member to exert at the contact a shortening force on the other member and including means for taking up any existing slack by increasing the effective length of said members during the non-operating portions of the cycle of valve movement.

Another object of the present invention is to provide a valve clearance regulator causing a shortening of the effective length of the valve operating linkage by a rotatable cam in said linkage eccentrically contacting another member therein with both the cam and said other member moving along intersecting paths.

Another object of the present invention is to provide a valve clearance regulator combined with a valve rotator means or other type rotator means for causing the valve clearance regulator to reduce the effective length of the valve operating linkage.

Another object of the present invention is to provide a valve clearance regulator that is a combination of the two valve clearance regulators mentioned in the immediately preceding two paragraphs for effecting more advantageous and/or greater shortening in the effective length of the valve operating linkage.

Another object of the present invention is to provide a valve clearance regulator having a positive means for decreasing the effective length of the members in the valve actuating linkage and a positive means for taking up any existing slack by increasing the effective length.

Another object of the present invention is to provide a valve clearance regulator of the self-contained mechanical type that has only a small number of parts, that can be placed in an easily accessible place in an internal combustion engine for servicing, that does not require precision tolerances or selective assembly in its manufacture, and that can work in any position, such as vertical, horizontal or upside down.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a side elevational view, with some parts shown in section, of a poppet valve assembly in a valve-in-head engine construction with the valve operating mechanism disclosing the first basic form of the present invention in a valve clearance regulator;

Fig. 2 is an end view of a portion of Fig. 1 taken from the right thereof wherein an eccentric type cam is used in the valve clearance regulator;

Fig. 3 is an end view similar to Fig. 2 but of a spiral type cam instead of an eccentric;

Fig. 11 is a side elevational view, partially in sections and resembling Fig. 1, of the second basic form of this invention in a valve clearance regulator;

Fig. 12 is a right end view of the clearance regulator shown in Fig. 11;

Fig. 13 is an end view, similar to Fig. 12, but of a modification of the Fig. 12 form of this invention showing only the cam and valve stem while omitting the rocker arm, pin with its lock wires, and torsional spring;

Fig. 14 is an end view, similar to Fig. 13, but of another modification of the Fig. 12 form of this invention;

Fig. 15 is a side elevational view, partially in section and resembling Fig. 1, of the third basic form of this invention; while

Before the valve clearance regulator here illustrated is specifically described, it is to be understood that the invention here involved is not limited to the structural details or arrangement of parts here shown since clearance regulators embodying the present invention may take various forms. It also is to be understood that the phraseology or terminology here employed is for purposes of description and not of limitation, since the scope of the present invention is denoted by the appended claims.

While my invention in a clearance regulator might be adapted to various types of mechanical movements, I have chosen to show the same as applied to a valve operating mechanism or linkage with particular emphasis on the valve-in-head type engine design.

Figure 15:
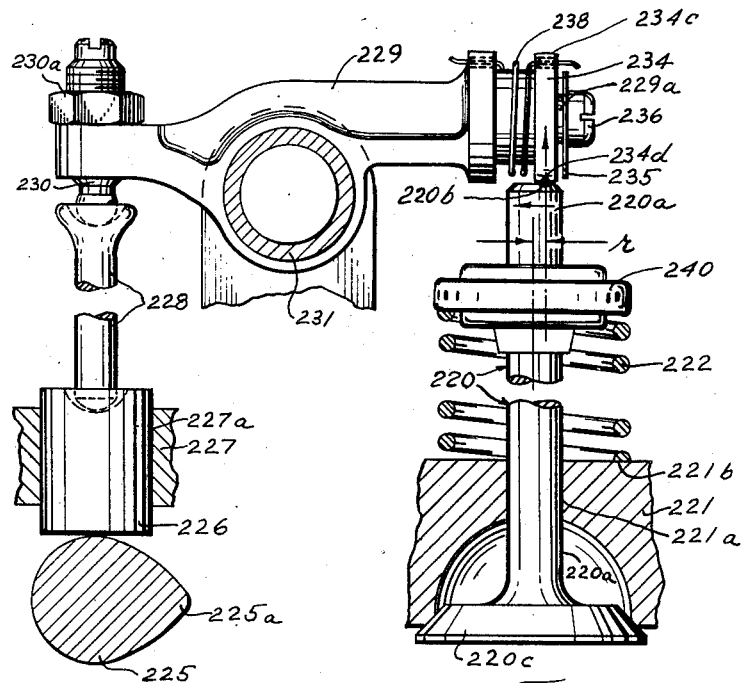

A general description of the conventional elements for a valve-in-head construction for a conventional internal combustion engine will be first given with special emphasis on the common conventional parts shown in Figs. 1, 11 and 15 of the drawings, which figures disclose the three basic forms of this valve clearance regulator invention. Poppet valves 20 (Fig. 1), 120 (Fig. 11), and 220 (Fig. 15) are mounted for vertically reciprocating opening and closing movement in their respective cylinder heads 21, 121 and 221 found in the conventional internal combustion engine. The valve stems 20a, 120a and 220a are slideably guided in their respective cylinder heads 21, 121 and 221 by bores 21a, 121a and 221a. The valves 20, 120 and 220 are biased toward valve closed position by their respective valve springs 22, 122 and 222, so that the valve heads 20c, 120c and 220c are normally closed as shown in Figs. 1, 11 and 15. Each valve stem is one of the members in the linkage or mechanical movement used in opening or closing its associated valve head. The lower end of the respective valve springs 22, 122 and 222 rest on supporting portions 21b, 121b and 221b of of their respective cylinder heads. A boss projects upwardly from each cylinder head and extends into the inner diameter and its associated spring for locating the lower end of the spring. The upper end of the valve spring 22 in Fig. 1 is held in fixed relationship to the valve stem 20a by a conventional valve spring washer 23 and keeper 24. The upper ends of valve springs 122 in Fig. 11 and 222 in Fig. 15 are held by valve rotator means as will be described in more detail hereinafter.

The conventional cam shaft having a valve operating cam synchronously driven by the motor is shown at the lower left in Figs. 1, 11 and 15 with the cams shown at 25, 125 and 225, for causing the valves to open and close.

A mechaincal movement or valve operating linkage connects cams 25, 125 and 225 to their respective valve heads 20c, 120c and 220c for causing opening and closing. This takes the form of tappet members 26, 126 and 226 intermittently raised and lowered by their respective cam lobes 25a, 125a and 225a as required by the timing of their respective valve cycles. The tappets 26, 126 and 226 respectively are guided for vertical reciprocating movement in the engine blocks 27, 127 and 227 by the guide bores 27a, 127a and 227a therein. The rocker arms 29, 129 and 229 rotate or oscillate on shafts 31, 131 and 231 respectively of the internal combustion engine. The motions of the tappets are transmitted through the push rod members 28, 128 and 228 to the respective rocker arm members 30, 130 and 230. The adjusting screws 30, 130 and 230 are normally locked into fixed position by their respective lock nuts 30a, 130a and 230a. This mechanical movement also includes a means for regulating the clearance between the members. The major portion of this clearance regulator is shown at the upper right in Figs. 1 and 11 and includes a means for decreasing the effective length of the members when valve operating force is applied and includes a means for taking up any existing slack by increasing the effective length of the members during the non-operating portions of the cycle of movement of cams 25, 125 and 225. The mechanical movement includes as members thereof not only the rocker arms 29, 129 and 229 with the cams secured to the right ends thereof in Figs. 1, 11 and 15 but also the valve stems 20a, 120a and 220a which the cams contact during opening and closing movements of the valves.

The purpose of the adjusting screws 30, 130 and 230 is to permit a preliminary adjustment of the effective length of the valve linkage members so that the clearance regulator will work in its proper operating range. These adjusting screws are not necessary if the lengths of the members making up each valve linkage are held to close tolerances.

If a fixed clearance is required in the valve operating linkage because of the design of the internal combustion engine cam shaft, one of the conventional clearance devices can be inserted somewhere in the linkage. A good example is disclosed in my U. S. Patent No. 2,176,895, entitled "Vibratory Mechanical Linkage," patented October 24, 1939. This patent discloses a leaf spring 47 and appurtenant parts thereto for this purpose and can be readily combined, for example, with adjusting screw 30 in Fig. 1 of the present application by anyone skilled in the art, if desired.

The general operation should be readily apparent. It will be described with reference to Fig. 1 since the structures shown in Figs. 11 and 15 operate in similar manners. The cam 25, when rotated, causes the cam lobe 25a to intermittently apply an operating force to the mechanical movement to open the valve by raising tappet 26, rotating rocker arm 29 clockwise on the shaft 31, and exerting a force through the clearance regulator cam for actuating the valve stem 20a by moving it downwardly to overcome the force of spring 22 to open the valve head 20c. As cam 25 continues to rotate, the lobe 25a moves past the tappet 26 so that the tappet is free to fall downwardly onto the approximately constant radius base circle of the cam for the dwell portion of the cycle. As the lobe 25a moves past the tappet 26, the valve spring 22 applies an operating force to the mechanical movement to rotate the rocker arm 29 counterclockwise while closing the valve head 20c. The valve head 20c is fully closed when the tappet 26 is riding on the dwell or base circle of the cam and no operating or moving force is applied to the mechanical movement. It should be clear now that the cam 25 with its lobe 25a and spring 22 coact together to intermittently apply an operating force to the mechanical movement to cause adjacent members in the movement to actuate each other.

The clearance regulators act during the valve opening and closing portions of the cycle to reduce the distance between the axes of rotation of the cams in the upper right in Figs. 1, 11 and 15 and the top of their respective valve stem 20a, 120a and 220a for decreasing the effective length of the members in each mechanical movement so that clearance exists therein when the tappets engage the base circles of their respective cams. Each valve clearance regulator also takes up any existing slack by increasing the effective length of the members, when necessary, when the tappet rides on the base circle of its cam by increasing the distance between the axis of rotation of the cam at the upper right and the top of its associated valve stem.

The necessity of using the valve clearance regulator is easily explained. During the operation of an internal combustion engine, thermal changes take place in the engine which cause changes in the effective length of the valve operating linkage. If the linkage becomes too long, it will prevent the valve from seating. This will result in loss of power or burning of the valve heads and valve seats. If the linkage becomes too short, the valve will seat too early on the flank of the cam lobe (25a, 125a or 225a) contour. This will result in noisy operation and excess wear on the valve seat from the high velocity closing. The valve timing will also be affected by a change in valve clearances. This in turn will influence the smoothness and idling characteristics of the internal combustion engine.

In the previous art of self-contained mechanical valve clearance regulators, many different constructions have been used to create and to take up the valve operating linkage clearances. Some take the form of spring biased screws, wedges, eccentrics or equivalents. In these devices, the slippage angle of the clearance or slack take-up element has been selected just within the self-locking angle so that either the suddenly applied load of opening the valve or the rolling action of the eccentric will produce a small amount of slippage, which slippage is recovered, if necessary, after seating of the valve so that a constant clearance is maintained. The sliding friction, however, changes over a wide range of values so that it is very difficult, if not impossible, in these previous valve clearance regulators to select a slippage angle which would include all probable values of sliding friction so that (1) the regulator would not collapse when the valve operating force is applied, or (2) the regulator would not become inactive when friction values were high, or (3) the regulator would not become inactive when the engine is operating at a low R. P. M. when the impact values during valve operation are small.

In the present invention, I also use an eccentric or equivalent type cam for a clearance or slack take-up element. However, due to the novel arrangement of the same, I am able to select a small enough slippage angle so that under all probable values of sliding friction no collapsing of the clearance regulator will take place. I do not depend on suddenly applied, unpredictable, loading or rolling action of an eccentric to produce a slight amount of excess clearance by decreasing the effective length of the valve operating linkage. However, I do depend on an action, as will be explained in more detail hereinafter, that produces a positive amount of excess clearance not dependent on a critical and unstable coefficient of friction between some of the valve operating linkage elements in the valve clearance regulator.

Figure 4:
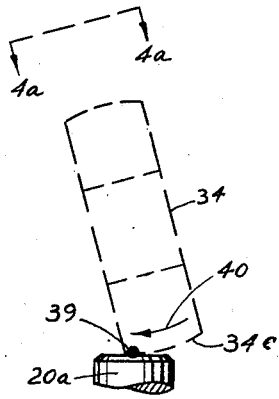
Fig. 4 is a diagrammatic view of the cam and the top of the valve stem when the valve is fully closed, as shown in Fig. 1.
Figure 6:
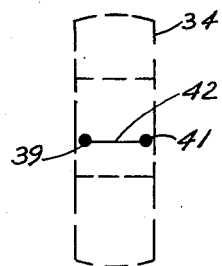
Fig. 6 is a diagrammatic plan view of only the cam periphery showing both the contact points shown in Fig. 4 and the ones shown in Fig. 5 with the movement therebetween.
Figure 5:
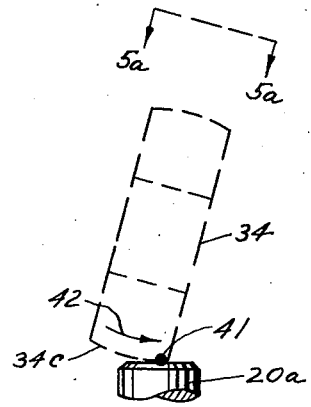
Fig. 5 is a diagrammatic view of the cam and valve stem, similar to Fig. 4, but taken when the valve is fully opened.
Figures 5A, 6A:
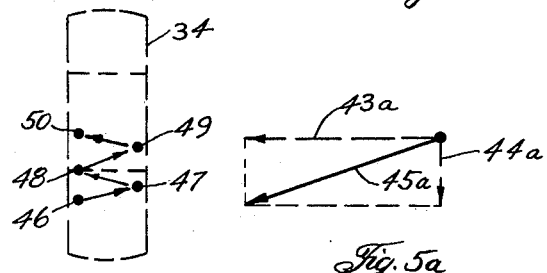
Fig. 5a is a plan view of the force diagram at the contact point of the cam and valve tip taken along the line 5a—5a of Fig. 5.
Fig. 6a is a diagrammatic plan view similar to Fig. 6 but showing the path of travel of the contact points between the cam and valve stem during two cycles of operation (opening and closing) of the valve.

The first basic form of valve clearance regulator means is disclosed in Figs. 1 and 2 of the drawings with the force diagrams therefor being shown in Figs. 4, 4a, 5, and 5a and with the path of movement of contacting points shown in Figs. 6 and 6a. This valve clearance regulating means includes a means for decreasing the effective length of the valve head operating linkage members and includes also a means for taking up any existing slack by increasing thereafter the effective length. The structure included in this valve clearance regulator will be first described in detail before its operation in decreasing and increasing the effective length is described.

In Fig. 1, the valve actuating ends of rocker arm 29 terminates in a cylindrical, short shouldered, shaft-like portion 29a on which is rotatably mounted a cam 34. The cam is held endwise onto the shaft-like portion 29a by a washer 35 secured to the shaft-like portion 29a by a screw 36 threaded into a tapped hole in the end of the shaft-like portion 29a. The cam 34 has a small amount of end play on the shaft-like portion 29a since clearance spacing is provided between shoulder 29d on the rocker arm and the cam 34. The cam 34 is free to rotate on the shaft-like portion 29a at all times in either direction when the proper combination of forces act thereon, as will be brought out in more detail hereinafter.

The cam 34 may take various forms, but each form has certain features in common. The cam surface or periphery 34c in Fig. 2, for example, is so constructed that the rotation of the cam in the clockwise direction, as shown by arrow 34a, will increase the distance between the axis of rotation of the cam on the shaft-like portion 29a and its contact point 34d on said cam surface 34c making common contact with the common contact point 20b of the top of the valve stem member 20a, as shown by the dot in Fig. 2. Rotation of cam 34 in the opposite or counterclockwise direction will decrease the radial length for decreasing the distance between the axis of rotation and the contact point. A cam with this change in radial length also apparently has at all time an eccentricity e, as shown in Fig. 2, between its axis of rotation and the contact point 34d between the cam surface and the valve stem number 20a.

The cam surface or periphery 34c is also substantially self-locking so that the cam will not rotate about its axis under static conditions (when rocker arm 29 and valve stem 20a are not moving) if only the normal operating force exists between the members. As will be brought out in more detail hereinafter, however, the normal operating force is sufficient to rotate the cam when it causes additional forces due to the relative movement between the members in the valve operating linkage. This self-locking is obtained by having a small angle of slope at the cam periphery 34c at the contact point 34d. However, the degree of self-locking is not important. Any self-locking angle may be used, for example, the angle of slope may vary between one-half degree and six degrees. The angle of slope of the cam periphery does not have to be critically balanced against the probable coefficient of friction between the cam 34 and the shaft-like portion 29a to get an operative valve clearance regulator.

The cam 34 can take various forms. An eccentric is shown in the plane of the drawing in Fig. 2. Although an eccentric may be used, the value of the eccentricity e will vary for different rotative positions of the cam 34 and under some conditions this may not be too desirable. Fig. 3 illustrates an alternative form of cam at 34' which has a periphery 34c in the form of a spiral in the plane of the drawing. A cam having a peripheral cam surface in the form of a logarithmic or Archimedes curve, either the eccentricity e or the slope at the contact point is nearly constant whenever the curve makes contact with the valve stem, and not only the radial distance between the axis of rotation of the cam periphery and the peripheral contact point increases as the cam rotates clockwise but also the radius of curvature of the cam periphery will increase. Also, the radial length from the rotational axis of the cam 34' to the contact point on the valve stem increases when the cam is rotated clockwise in the direction of the arrow in Fig. 3 while it decreases when the cam is rotated counterclockwise. Any of these curves mentioned will give good results.

It should be understood that the words cam and cam surface include screws, moving wedges and other equivalent structures having cam-like surfaces, if they have the desired characteristics mentioned herein.

It should be noted in Fig. 1 that the plane of rotation of cam 34 (the plane extending perpendicular to the axis of rotation of the cam) is parallel to the axis of rotation of rocker arm 29 on shaft 31. The two axes are shown as being in different planes in Fig. 1 but they may be coplanar, if so desired.

The cam 34 is biased by a torsion spring 38 urging it to rotate clockwise in Fig. 2 in the direction of the arrow 34a to take up play or slack in the valve linkage if any should exist when the valve is in its closed position, as shown in Fig. 1. One end 38a of the torsion spring 38 projects toward the right through an opening 34b in the cam 34. The other end 38b of the torsion spring is fastened in a hole 29b in a flange projecting outwardly from rocker arm 29. The washer 35 has two stop lugs 35a and 35b integrally formed therewith, as shown in Figs. 2 and 3. These two stop lugs limit the rotation of the cam within its intended working range since they are so positioned that the torsion spring end 38a cannot pass beyond either stop lug. With an eccentric type cam, as shown in Fig. 2, the working range of the cam is somewhat limited so the spring end 38a moves over the smaller arcuate length between the stop lugs, while in Fig. 3 the spiral type cam has a larger working range so that the spring end 38a can move between the larger arcuate length between the stop lugs. These stop lugs are provided so that if the valve sticks in a partially or fully opened position, the stop lugs will prevent the unwinding of the cam by the torsion spring 38. Also, they are of convenience during assembly of the valve linkage members. The washer 35 is clamped tightly to the end of the shaft-like portion 29a by a screw 36 so that the washer 35 cannot rotate to change the position of the stop lugs 35a and 35b. Any type conventional means can be used to prevent rotation of the washers, if necessary, such as a non-circular form on the end of the shaft-like portion 29a fitting into a mating non-circular hole in washer 35.

The portion of the clearance regulator which decreases the effective length of the valve operating linkage members will be first described. The rocker arm 29 in Fig. 1 oscillates between fixed limits during the valve opening and closing cycle. For the purpose of illustrating a typical operation, let us assume the arc through which the rocker arm 29 oscillates is 9°. The cam 34 will then oscillate through the same arm of 9°. Figs. 4, 4a, 5, 5a, 6 and 6a schematically illustrate the forces involved and the trace of the common contacting points between the cam surface and the top of the valve stem 20a as the rocker arm oscillates during opening and closing of the valve. The angles of motion have been slightly exaggerated for purposes of better illustrating the operation in Figs. 4 to 6a inclusive. Due to the oscillation of the rocker arm 29, a wiping action or a relative sliding movement takes place between the cam periphery 34c and the top of the valve stem 20a. It should be noted that as the rocker arm 29 oscillates, any two common contacting points on the cam surface 34c and on the valve stem 20a (two of which are shown as 20b and 34d by the dot in Fig. 2) move along intersecting paths since the rocker arm 29 oscillates in an arc around its axis on shaft 31 while valve 20 reciprocates along a vertical axis.

Considerable relative sliding movement takes place between the cam surface 34c and the valve stem 20a while the valve 20 is being opened and closed. For simplifying the theoretical discussion, it will first be assumed that cam 34 is of constant radius and has no eccentricity. Fig. 4 shows the cam surface 34c in contact at 39 with valve stem 20a when the valve is fully closed, as shown in Fig. 1, but when the rocker arm 29 is beginning to rotate clockwise to open the valve. As the valve opens, the cam 34 rotates clockwise to slide over the top of the valve stem in the direction of the arrow 40. Fig. 5, similar to Fig. 4, discloses the position of the members when the valve is fully open but is just starting to close. Cam surface 34c has a contact point 41 with the valve stem 20a. As the valve closes, the cam 34 rotates counterclockwise to slide across the top of the valve stem 20a in the direction of the arrow 42. From a study of Figs. 4 and 5, it can readily be seen that considerable relative sliding movement takes place between the cam surface 34c and the top of the valve stem 20a since common contacting points on cam surface 34c and valve stem 20a move along intersecting paths. Fig. 6 discloses a composite plan view of Figs. 4 and 5 taken along lines 4a—4a and 5a—5a respectively. The path of the sliding contact on cam surface 34c with valve stem 20a between contact points 39 and 41 is represented by line 42. It should be noted that the path of relative sliding movement determined by the trace of the contact points on cam surface 34c in Fig. 6 is substantially at right angles to the plane of the rotation of cam 34 on the shaft-like portion 29a of the rocker arm 29 in Fig. 1. Since the axis of rotation of the cam is approximately at right angles in Fig. 1 to the axis of rotation of the rocker arm 29, the relative sliding movement alone between the cam surface 34c and valve stem 20a will not cause the cam 34 to turn on its axis during the valve operating cycle. The frictional force alone on the cam due to this sliding movement cannot rotate the cam because no component of force exists at right angles to the frictional force in the plane of cam rotation.

However, when the constant radius cam assumed for purposes of introductory explanation in the preceding paragraph is replaced by a cam 34 or 34', as shown in Fig. 2 or 3, or its equivalent, with an eccentricity e and a constantly decreasing radial length from its axis of rotation when it is rotated in one direction, a different situation exists. When the valve 20 is opened and closed, considerable operating force exists between cam 34 and valve stem 20a due to the bias of spring 22 and to the height of cam lobe 25a in Fig. 1. This operating force combined with the eccentricity e in Fig. 2 between the cam contact 34d and the axis of rotation of the cam creates a turning couple acting on cam 34 urging counterclockwise rotation of said cam in Fig. 2 to reduce the radial distance from the axis of rotation of cam 34 to its contact point 34d with the valve stem 20a to shorten the effective length of the valve operating linkage. However, since cam 34 is self-locking when only the normal operating force exists, no slippage takes place at common contact points 20b and 34d in Fig. 2 to permit counterclockwise rotation of the cam 34. However, when relative sliding movement takes place between the valve stem 20a and the cam surface 34c (as described in the previous paragraph and shown in Figs. 4, 5, and 6), cam 34 rotates counterclockwise to shorten the effective length of the valve linkage. The couple caused by the eccentricity e and the operating force acts in a different plane than the force created by the relative sliding movement mentioned in the previous paragraph; the planes are perpendicular to each other.

Figure 4A:
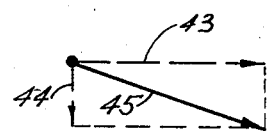
Fig. 4a is a plan view of the force diagram at the contact point of the cam and valve stem taken along the line 4a—4a in Fig. 4.

The forces acting on the cam surface 34c at its point of contact with the valve stem 20a are shown in Figs. 4a and 5a by vector force diagrams. Figs. 4a and 5a are plan views of Figs. 4 and 5 taken respectively along the line 4a—4a and 5a—5a. At the contact point between the cam surface 34c and the valve tip, two forces are active. One is caused by the frictional drag of the relative sliding action created by the oscillation of rocker arm 29, while the other is caused by the valve operating forces acting on the eccentric e tending to rotate the cam 34 counterclockwise in Fig. 2. These two forces make a right angle with each other as shown in Figs. 4a and 5a with their resultant forces acting on the cam at the point of contact in a direction tending to overcome spring 38 to turn the cam counterclockwise in the radius shortening direction. In Fig. 4a, the dotted arrow 43 represents the direction and magnitude of the force at contact point 39 on the cam surface due to the relative sliding action caused by the rocker arm 29 as cam 34 moves in the direction of the arrow 40 in Fig. 4. The dotted arrow 44 represents the direction and magnitude of the force at contact point 39 caused by the valve operating force combined with the eccentric e. The solid arrow 45 represents the direction and magnitude of the resultant of the two forces 43 and 44 acting at the contact point 39 while cam 34 is sliding across the top tip of the valve stem 20a while the valve 20 is being opened. Since an object must move in the direction of the resultant force causing the motion, the contact point 39 in Fig. 4 on the cam surface 34c must move in the direction of the resultant force 45, and in so doing, the cam 34 is rotated counterclockwise in Fig. 2 a slight amount to introduce slack in the valve linkage by shortening the effective length of the valve operating linkage. Fig. 5a is a vector force diagram, similar to Fig. 4a, but portraying the forces acting on cam surface 34c at contact point 41 while the valve 20 is closing. The force on cam surface 34c at contact point 41 due to the relative sliding movement between the cam surface and the valve stem caused by the oscillation of rocker arm 29 is shown as force 43a. Force 43a is opposite in direction but substantially equal in magnitude to the force vector 43 in Fig. 4a. The force exerted on the cam surface 34c by the normal valve operating force and the eccentricity e is shown as force 44a. The force vector 44a is equal in magnitude and extends in the same direction as force 44 in Fig. 4a. The resultant of the two vectors in Fig. 5a is shown by the solid arrow 45a representing the resultant force and its direction of action on cam surface 34c at contact point 41 during the sliding action of cam surface 34c over the valve stem tip in the direction of the arrow 42. Since the contact point 41 on cam surface 34c must move in the direction of this resultant force, for reasons as previously explained, this resultant force overcomes torsional spring 38 and rotates the cam 34 counterclockwise (Fig. 2) in the shortening direction in the same manner as the cam was rotated during the valve opening stroke.

Fig. 6a discloses the trace of the contact points of the cam surface 34c when two valve opening and closing cycles are required to shorten the effective length of the valve operating linkage until correct adjustment is reached. To illustrate, let us assume that the valve linkage is adjusted too tight by .002 inch, that the valve clearance regulator can back off the adjustment by .001 inch per valve cycle, and that when the contact point 50 (Fig. 6a) on cam surface 34c is reached, the effective length of the valve operating linkage is in correct adjustment. The common contact points between cam surface 34c and valve stem 20a, as shown by contact points 20b and 34d in Fig. 2, was originally at position 46 in Fig. 6a. After the first valve cycle, it moved to position 48 to loosen up the valve linkage by .001 inch. After the second valve cycle, the original contact point moved to position 50 to loosen the valve linkage the other .001 inch and to bring the effective length of the valve operating linkage to the correct value. During these two cycles, the common contact points between the top of the valve stem and the cam surface 34c traced out a zig-zag pattern on the cam surface 34c, as shown by the arrows in Fig. 6a. In effect, this trace follows a zig-zag path down-hill since the radius from the rotational axis of cam 34 to the common contact points decreases as the cam is rotated counterclockwise. Of course, it should now be apparent that the effective length of the valve operating linkage is shortened an equal amount during both the valve opening and the valve closing operation.

If cam 34 has a larger angle of slope for less self-locking, it should readily be apparent that this will cause a faster zig-zag down-hill run of the common contact points so that a greater distance will exist between pairs of contact points 46 and 48, 47 and 49, and 48 and 50 in Fig. 6a.

In summary, it may be said that several factors are present for causing a force to be exerted on cam surface 34c at the contact point 34d to urge said cam to rotate counterclockwise for decreasing the radial length so that the effective length of the valve actuating linkage is reduced. First, rocker arm 29 with cam 34 and valve stem 20a are so mounted that their common contact points move along intersecting paths. Second, the normal valve operating force exists between the members during the shortening movement. Third, the axis of rotation of the cam 34 is eccentrically located a distance e from the contact point and the cam decreases in radius when rotated in one direction and increases in radius when rotated in the opposite direction. The first and second factors combine to create forces 43 and 43a in Figs. 4a and 5a respectively while the second and third factors combine to create forces 44 and 44a with the resultant 45 and 45a causing counterclockwise rotation of cam 34 in Fig. 2 to shorten the effective length of the linkage even though neither force 44, 44a, 43 nor 43a will alone rotate the cam. It should be noted that cam 34 is rotatably secured to shaft-like portion 29a in free-to-rotate condition at all times during the application of the valve operating forces. No unstable, critical friction must exist between the cam 34 and the shaft-like portion 29a to lock the cam against rotation during portions of the valve opening and closing cycle.

After the effective length of the linkage has been shortened, it is lengthened, if necessary, to take up any existing slack in the linkage. This occurs during the non-operating portions of the cycle of valve movement when the valve 20 in Fig. 1 is fully closed and the tappet 26 is riding on the constant radius base circle dwell portion of cam 25. If any excess clearance exists after the valve 20 has been seated, spring 38, resilient biasing cam 34 to rotate clockwise in the direction of arrow 34a in Fig. 2, will rotate the cam clockwise to increase the radial length from the axis of rotation of the cam to its contact with the top of the valve stem 20a to take up any existing slack or play to readjust the valve operating linkage to its correct effective length. This will occur before the next valve opening operation begins. The torsion spring 38 has insufficient torque to overcome spring 22 to open the valve 20 and has considerably less torque than is produced by the forces 45 and 45a in Figs. 4a and 5a respectively. Hence, the spring 38 only rotates during the non-operating portions of the cycle of valve movement and only takes up the existing slack or play in the linkage.

Hence, it is readily seen that in the previously described manner the operating clearance in the valve linkage received a correct adjustment during each cycle of valve operation while the clearance is maintained at a practical minimum. If for some reason the effective length of the valve operating linkage is in excess of the amount which one corrective adjustment during one valve operating cycle can remedy, then a slight amount of corrective adjustment will be made during each successive valve operating cycle until the minimum practical valve clearance is established.

In installing the valve clearance regulator in an internal combustion engine, the adjusting screw 30 should be so set that cam 34 can rotate either clockwise or counterclockwise in Fig. 2 over an adequate operating range. The stop lugs 35a and 35b should be so adjusted that the cam must stay in its proper operating range. The adjusting screw 30 along with the locking nut 30a, however, can be dispensed with; the push rod 28 can pivot directly on rocker arm 29 if all the members making up the valve operating linkage can be held within close length size limits.

Since cam 34 is continuously rotating clockwise and counterclockwise to allow for changing conditions in the engine by moving under the effect of the resultant forces, it is important that it be adequately lubricated. Rocker arm 29 has an oil passage 29c which supplies oil from the pressurized rocker arm shaft chamber 31a to the spacing 37 between cam 34 and the rocker arm shoulder 29d so that the cam bore surrounding the shaft-like portion 29a is adequately lubricated. By controlling the amount of end play clearance 37, it is possible not only to control the lubricating oil flow to cam 34, shaft-like portion 29a and valve stem 20a but also to automatically clean the oil outlet by the scrubbing action of the cam 34 rotating back and forth across the outlet. The spacing or clearance 37 required may be only a few thousandths of an inch because the oil supply to the valve stem is very critical in an engine. Therefore, this scrubbing action will help maintain free oil flow. This same type oil flow passageway construction can be used in the other forms of the invention disclosed in this application even though it is completely portrayed only in Fig. 1.

Figure 9:
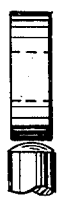
Fig. 9 is a side elevational view, with some parts in section, of a portion of Fig. 1 but showing a modified form of contacting surface between the cam and valve stem instead of that disclosed in the Fig. 1 form of this invention.

It is preferable that during the opening and closing motion of the valve 20 that the contact points between cam surface 34c and valve stem 20a in Fig. 1 stay reasonably close to the longitudinal central vertical axis of the valve stem so that a minimum of side thrust is exerted on the valve stem 20 during the opening and closing operation. Either the cam periphery 34c, as shown in Fig. 1, should be rounded (shown as arcuate) while the top of the valve stem 20a is straight or flat or the top of the valve stem should be rounded (shown as arcuate in Fig. 9) while the periphery of the cam should be straight across extending parallel to the axis of cam rotation. The path of contact on one of said members being arcuate in shape while the contact on the other member is along a straight line. The rounded surface on the eccentric cam 34 in Fig. 2 may take the form of a portion of a sphere.

Figure 7:
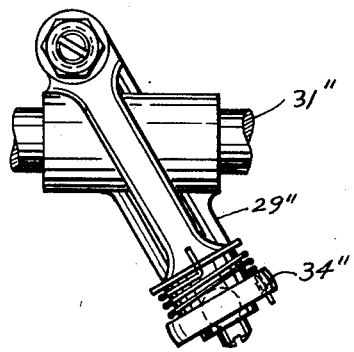
Fig. 7 is a valve clearance regulator that is a modification of the Fig. 1 form of this invention.

Fig. 7 discloses a modification of the basic form of this invention shown in Fig. 1. A cam 34", similar to cam 34, is rotatably mounted on the shaft-like portion on the end of a rocker arm 29" which in turn is rotatably mounted on a shaft 31", similar to rocker arm shaft 31. In this invention the rocker arm 29" that extends out to support the rotatably mounted cam 34" makes an angle with the rocker shaft 31". It should be noted that the plane of rotation of the cam 34" is no longer parallel with the axis of rotation of the rocker arm on the rocker arm shaft. However, even though the plane of rotation is no longer parallel with the axis, the axis makes less than a 90° angle with the plane. The means for decreasing the effective length of the valve operating linkage as well as the means for taking up any existing slack by increasing the effective length operate basically the same as before. However, although the cam 34" still must slide over the valve stem tip and the component forces shown in Figs. 4a and 5a are still active, the angular relationship of the axis of rotation of the rocker arm and the plane of rotation of the cam will cause forces 43, 44, 43a and 44a to assume a slightly different angular relationship so that the resultant forces 45 and 45a will be slightly less effective in causing rotation of the cam 34" in the radius shortening direction, but these forces will nevertheless be active in producing a cyclic shortening of the effective length of the valve operating linkage during each valve cycle. The decrease in the effective length of the valve operating linkage will become smaller as the angle between the plane of rotation of cam 34" and the axis of rotation of the rocker arm 29" on rocker arm shaft 31" approaches 90°. In actual engine operation, this decrease in effective length is around .001 to .0001 inch depending on the magnitude and direction of the resultant forces 45 and 45a in Figs. 4a and 5a. This angle between the rocker arm oscillation axis and the plane rotation of the cam must be sufficiently less than 90° to cause movement of the contact point between the cam surface and the valve stem with a component of movement over the cam surface in the axial direction of the cam so that the cam will rotate in its radius shortening direction. As a practical matter, 85° is about the limit since relatively little positive linkage shortening will take place by the forces disclosed in Figs. 4a and 5a when the angle lies between 85° and 90°. As the angle approaches 90°, the horizontal distance between the outermost contact point dots in Fig. 6a will decrease so that the vertical distance between the contact point dots will also consequently decrease to reduce the shortening during each valve operating cycle. The axes of cam rotation and of rocker arm oscillation are parallel when the plane of cam rotation extends 90° to the rocker arm oscillation axis.

It should be noted that the relationship between the plane of rotation of the cam and the rocker arm oscillation axis can be expressed in other manners. Any two common contact points on the cam peripheral surface and valve stem travel along intersecting paths which determine a plane (parallel to the plane of the drawing in Fig. 1). First, it should be noted that the axis of rotation of the cam in Fig. 1 is parallel with this plane so that, to be less than the 85° critical angle, it must form an angle between 0° (parallel) and 85° with this plane. Second, it should be noted that a generated surface extending perpendicular to this plane and being continuously extended infinitely in all directions and including the plane locating contact line of travel on one of the members, either the cam or the valve stem, will be intersected by the axis of rotation of the cam at an angle greater than 0°.

Figure 8:
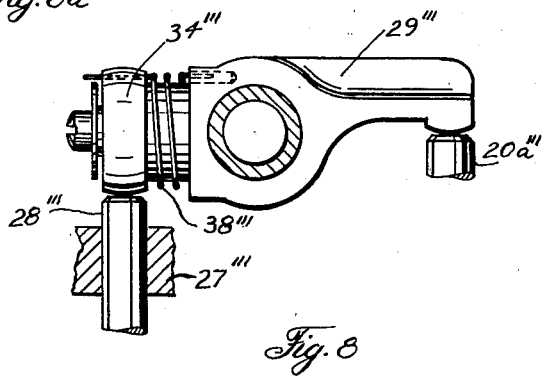
Fig. 8 is a valve clearance regulator wherein the cam is mounted on the left end instead of the right end of the rocker arm to portray another modification of the Fig. 1 form of this invention.

Fig. 8 discloses a modification of Fig. 1 wherein a cam 34'" is rotatably mounted on a rocker arm 29'", in the same manner as in Fig. 1, but on the left end of the rocker arm so that it contacts the top of the push rod 28'" extending upwardly from the cam shaft cam. The right end of the rocker arm engages the top of the valve stem 20a'".

This construction operates in basically the same manner as the one fully described that is illustrated in Fig. 1. The valve clearance regulator in Fig. 8 includes a means for decreasing the effective length of the valve operating linkage members when the operating force is applied and includes the torsional spring 38'" for taking up any existing slack by increasing the effective length of the members during the non-operation portions of the cycle of valve movement. The advantage of this construction occurs where the rocker arm is shorter on the push rod end. The valve clearance regulator adjusting range is increased because of the multiplication effect due to the rocker arm length ratio. Also, the upper end of the push rod is guided in the engine cylinder block 27'" to prevent it from moving laterally while the cam 34'" slides over the upper end of the push rod 28'".

Figure 10:
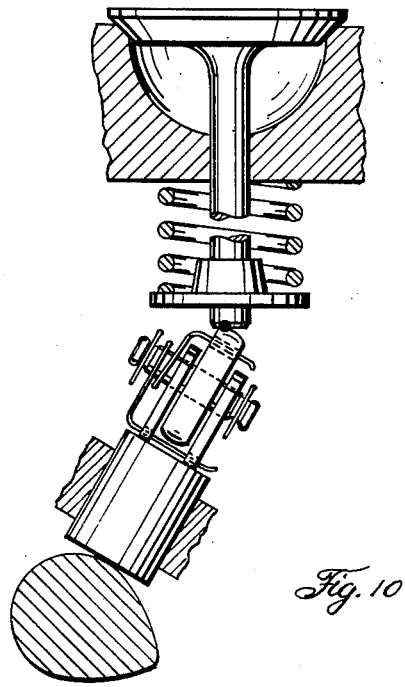
Fig. 10 is a schematic view of valve operating members, equivalent to the rocker arm with its cam and the valve stem of Fig. 2, wherein said members move along straight line intersecting paths and presents another modification of the Fig. 1 form of this invention.

The intersecting lines of movement need not be composed of an arcuate line of movement and a straight line of movement, as shown in Figs. 1, 7 and 8. Any mounting of the linkage members is satisfactory that causes the common contacting points on the cam surface and the member in contact therewith to move along intersecting paths. For example, Fig. 10 shows contacting valve linkage members moving along intersecting straight line paths so that the rocker arm is not needed. This construction may find use in an L-head type internal combustion engine. The valve clearance regulator operates in basically the same manner for decreasing the effective length of the linkage members and for taking up any of the existing slack by increasing the effective length of said members during the non-operating portions of the cycle of movement. If desired, the intersecting paths may both be arcuate with two rocker arms composing this portion of the linkage with one rocker arm rotatably mounting the cam that contacts the other rocker arm.

The second basic form of this invention is shown in Figs. 11 and 12. They also disclose a valve clearance regulator means including a means for decreasing the effective length of the valve operating linkage members when the valve operating force is being applied and including a means for taking up any existing slack by increasing the effective length of the linkage members during the non-operating portions of the cycle of valve movement. However, the specific structure will be described first before the operation for decreasing and increasing the effective length.

It should be noted that the structure in Fig. 11 is basically the same as Fig. 1 except for the portion between the right end of the rocker arm 129 and the top of the cylinder head 121. The right end of the rocker arm 129 forms forked ends 129a, 129a. A cam 134 is mounted in the opening between the forked ends for rotation on a pin 135 that extends through aligned holes in the forked end. The pin 135 has grooves 135a, 135a formed at opposite ends and spring lock wires 136, 136 snapped respectively in these grooves to prevent removal of pin 135 from the aligned holes in the forked ends. The cam 134 is similar to cams 34, 34' or their equivalent, as previously described, in that it is substantially self-locking and is mounted for rotation about an axis while having its cam surface 134c contacting the upper end of the valve stem 120a at common contact points 134d, 120b shown by the dots in Figs. 11 and 12.

The axis of rotation of cam 134 on pin 135 is approximately parallel to the axis of rotation or oscillation of rocker arm 129 on rocker arm shaft 131 in Fig. 11. The cam surface 134c, as viewed in the plane of the drawing in Fig. 11, is so constructed that rotation of the cam in the counterclockwise direction increases the cam surface radial length from its axis of rotation to the contact point 134d while clockwise rotation decreases this radial length. The cam surface 134c has at all times a small angle of slope for making the cam substantially self-locking, as previously described, so it will not rotate about its axis under only the normal valve operating force.

The eccentricity e in Fig. 2 is not necessary for creating the shortening forces in the Fig. 11 construction although it may be inherent in a cam of changing radius. The cam 134 is always maintained free to rotate on the pin 135 during any part of the valve operating movement, either opening or closing movement, when the proper forces are acting to urge the cam 134 to rotate clockwise for decreasing the effective length of the valve operating linkage members.

A torsional spring 138, similar to the previously described spring 38 in Fig. 1, is provided for resiliently biasing the cam 134 and urging it to rotate in the direction of the arrow 134a to increase the radial length of the cam to the contact point for taking up any undesirable clearance in the valve linkage during the non-operating part of the valve cycle. One end of the torsion spring 138 is shown at 138a as extending through a hole 134b in the cam 134, while the other spring end 138b extends through a hole 129b in the rocker arm 129. The coils in the spring 138 are further supported by pin 135.

The valve 120 is provided with a valve rotator 140 which rotates the valve 120 a small amount during each valve operating cycle. One type of valve rotator is disclosed in the patent to E. K. Ralston, U. S. Patent No. 2,397,502, entitled "Valve Rotating Device," patented April 2, 1946. This rotator is positive in action and rotates the valve 120 in a given direction only, as indicated by the arrow 120d in Figs. 11 and 12. It should be noted in Fig. 12 that the cam surface 134c contacts the top of the valve stem an offset radius r distance away from the longitudinal vertically extending axis of rotation of the valve stem when the valve rotator 140 rotates the valve stem.

The valve rotator performs a dual function because it not only rotates cam 134 clockwise to decrease the effective length of the valve operating linkage, as will be decribed in more detail hereinafter, but also maintains clean surfaces on the contact faces of the valve head 120c and the valve seat. Although the aforesaid Ralston patent rotates the valve about its longitudinal vertical axis in Fig. 11 on the valve opening stroke, other types of valve rotators rotating on the closing stroke or on a combination of the opening and closing stroke will work equally well in this valve clearance regulator.

The operation of the valve clearance regulator for decreasing the effective length of the valve linkage members when the valve operating force is applied should now be apparent. As the valve rotator 140 rotates the valve stem 120a about its vertically extending longitudinal central axis in the direction of arrow 120d in Figs. 11 and 12, the cam 134 in Fig. 11 is rotated clockwise in the direction of the arrow 134e on the cam in Figs. 11 and 12. It should be noted that the cam surface in Fig. 12 is rounded while the top of the valve stem 120a is flat so that the two members make a point contact with the offset radius r being sufficient to cause rotation of the cam 134 while overcoming torsional spring 138 since the friction between the valve stem 120a and the cam surface 134c is sufficient to cause the rotating valve stem to rotate the cam. Since the amount of valve rotation per valve operating cycle is small and since the offset radius r can be made of any desirable dimension, the angular amount of rotation of cam 134 to give satisfactory valve operation at all times can be easily obtained. This valve rotator causes a tangential force to be exerted on cam 134 at the common contact points 120b and 134d during the application of the valve stem member 120a for causing the cam 134 in Fig. 11 to rotate clockwise for decreasing the radial length of the cam and the effective length of the valve operating linkage members. The offset radius r is of sufficient length when the valve rotator rotates the valve stem so that it will cause a sufficient decrease in the effective length of the valve linkage operating members. A sufficient reduction may be between .00001 to .001 inch per stroke, depending upon the installation. This Fig. 11 construction may give a larger or smaller decrease in the effective length than the Fig. 1 construction; the decrease will depend on the length of offset radius r. At high engine speeds, the rotating momentum of the valve may cause the clockwise rotation of cam 134 to continue even until the valve is being closed.

The spring 138 operates in the same manner as spring 38 in taking up any existing slack during the non-operating portions of the cycle of valve movement to resiliently urge the cam 134 to rotate in the direction of the arrow 134a for increasing the radial cam length while the valve moving forces are not operating so that any existing slack or play in the valve operating will be taken up and the effective length of the linkage will be readjusted to the correct value. The torsion spring 138 has insufficient force to unseat the valve head 120c against the action of valve spring 122.

Although the axes of the rotation of the rocker arm 129 and of the cam 134 in Fig. 11 are shown as being parallel, this parallel relationship need not exist as long as the proper offset radius r exists when the valve rotator 140 rotates the valve stem 120a in a direction to rotate cam 134 clockwise in Fig. 11 for shortening the effective length of the valve operating linkage. The plane of rotation of cam 134 can extend parallel to the rotational axis of the rocker arm 129 to resemble the structure shown in Fig. 1, if desired.

In describing Fig. 12, it was mentioned that point contact had to exist between the cam surface 134c and the valve stem 120a at common contact points 134d and 120b at the offset radius distance r. In Figure 12, the peripheral cam surface 134c is rounded (shown as arcuate in form) while the top of the valve steam 120a is flat to produce this point contact. In Fig. 13, a modified cam 134' and valve stem 120a' is shown with a rounded (shown as arcuate) surface on the top of the valve stem but with the periphery 134c' of the cam extending parallel to the axis of rotation of the cam so that it is straight in the generally extending axial direction. In Fig. 14, another modified cam 134" and valve stem 120a" is shown with the valve stem having a rounded top (shown as arcuate shape) while the cam surface 134c" is angularly disposed with respect to the axis of rotation of the cam but is straight in the generally extending axial direction. Both the Fig. 13 and Fig. 14 construction provide common contacting points between the cam and valve stem tip as shown by the dots in said figures, spaced an offset radial distance r from the vertically extending, longitudinal axis of rotation of the valve so that the rotation of valve stem 120a' and 120a" in the direction of the arrows rotates cams 134' and 134" in the direction of their arrows.

Another modification of the Fig. 11 construction would consist of having a cam similar to cam 134, mounted on the left end of rocker arm 129 in Fig. 11 and having an equivalent offset radius while the cam peripheral surface engages the top of the push rod, in a manner similar to that shown in Fig. 8, but with the push rod being rotated by the relative movement between the cam and the tappet with the cam shaft cam engaging the tappet off-center to cause the push rod to rotate the cam in Fig. 11 clockwise in the radius shortening direction. Care must be taken in this construction to be sure that push rod will rotate during each valve operating cycle to always give the same positive shortening obtained by valve rotator 140.

It should readily be apparent that the cam 134 can be reversed on pin 135 in Fig. 11 so that counterclockwise rotation will shorten the radial length of the cam and the effective length of the valve operating linkage members while clockwise rotation will lengthen the radial length when torsional spring 138 is arranged to urge the cam to rotate in this direction. The valve rotator 140 will still rotate the cam 134 in the cam radius shortening direction during the opening stroke but the cam must contact the top of the valve stem on the opposite side of the longitudinal vertically extending central axis of the valve stem shown in Fig. 12.

In the Fig. 11 construction, and especially when cam 134 is reversed as mentioned in the previous paragraph, other cam rotating forces may be present if certain structural relationship exist. Particular reference is made to the U. S. Patent No. 1,950,590, issued to G. P. Berry on March 13, 1934, entitled "Slack Adjuster for Valves." In the Berry construction, the valve operating linkage shortens during the valve closing stroke which is considerably different than that mentioned heretofore. If the critically balanced cam self-locking angle and the coefficient of friction between the cam and the pin on which it is rotatably mounted exist, then the forces present in the Berry patent may aid in shortening the valve in the present invention. The resultant of the forces in Berry and those caused by valve rotator 140 will rotate the cam in its radius shortening direction to decrease the effective length of the linkage. The Berry forces can be used, if present, but it should be clearly understood that the present invention can operate without them. All forms of the present invention operate independently of the (1) cam self-locking angle as long as the cam is self-locking and (2) coefficient of friction between the cam and the pin or shaft-like portion on which it is rotatably mounted. It should be noted that the cams 34, 134 or 234 in applicant's invention are rotatably secured at all times in free-to-rotate condition during the application of the valve operating forces; none have to be locked with critical pivot pin friction during either the opening or closing valve movement. The coefficient of friction between any two parts will naturally change after the parts have been continuously moved back and forth with respect to each other so therefore the present invention operating without a critical coefficient of friction, will have a long wear life.

It should also be noted the form of the invention disclosed in Figs. 11 and 12 does not necessarily require that the common contacting points between the cam and valve stem move along intersecting paths. Instead, they can move along coinciding straight lines if the cam 134 is rotatably mounted on the end of another reciprocating member instead of rocker arm 129. Of course, with this construction the forces disclosed in the Berry patent would not be present since his construction requires that the parts move along intersecting paths.

During the operation of the internal combustion engine, the effective length of the valve linkage changes continually due to temperature variation in the metal parts. This change in length per valve cycle is very small and under average operating conditions the invention disclosed in Fig. 11 will be able to keep up with these length changes. However, should a very sudden change in length of the valve linkage occur, for example if the exhaust valve heats up and increases in length, then the valve stem rotation caused by the valve rotator 140 will continue to turn the cam 134 clockwise in Fig. 1 with its radius shortening until a slight amount of excess slack is again introduced. Any existing slack is removed by the action of torsional spring 138 in the non-operating portions of the cycle of valve movement. This ability to keep on shortening the effective length of the linkage in case the rate of effective lengthening of the linkage from an increase in temperature exceeds the normal shortening of the valve clearance regulator is quite important. This valve clearance regulator continues to operate under these conditions.

Figure 16:
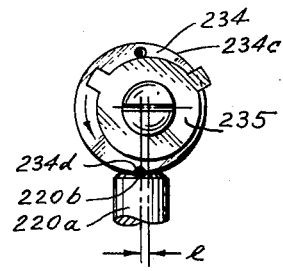
Fig. 16 is a right end view of Fig. 15.

Figs. 15 and 16 disclose the third basic form of the invention which form operates on a combination of the principles used in the valve clearance regulators shown in Figs. 1 and 11 of the drawings. Shaft-like portion 229a, cam 234, washer 235, screw 236, torsional spring 238, eccentricity $e$, offset radius $r$, and valve rotator 240 correspond respectively to shaft-like portion 29a (Fig. 1), cam 34, washer 35, screw 36, torsional spring 38, eccentricity $e$ (Fig. 2), offset radius $r$ (Fig. 12) and valve rotator 140. The construction in Figs. 15 and 16 is exactly like that shown in Figs. 1 and 2 respectively except that a valve rotator 240 is added to the valve stem and the cam peripheral surface engages the top of the valve stem with an offset radius $r$ from the vertically extending, longitudinal axis of rotation of the valve so that not only the resultant forces disclosed in Figs. 4a and 5a cause a portion of the cam rotation but also the rotation of the valve causes a portion of the cam rotation but also the rotation of the valve stem 220a causes a portion of the cam rotation in the radius shortening direction in the direction of the arrows in Fig. 15 while overcoming the torsional spring 238. This construction can be designed to give a rapid shortening since each of the forces will provide a portion of the shortening of the valve operating linkage. It could also be used where neither the Fig. 1 nor the Fig. 11 construction is satisfactory. It should be noted that the points of contact 234d, 220b between the cam 234 and the top of the valve stem 220a, as shown by the dots in Figs. 15 and 16 will not remain in the same place during the valve opening and closing stroke but will move back and forth horizontally across the top of the valve stem 220a. Therefore, the offset radius distance $r$ should occur when the valve rotator 240 is rotating the valve stem 220a in a direction to rotate the cam 234 in its radius shortening direction against the force of torsional spring 238. The peripheral cam surface 234c is rounded or arcuate in form in Fig. 15 to provide the point contact shown in Fig. 12 as well as the desirable force relationship acting on the valve stem from the construction shown in Fig. 1. It should be readily apparent that Figs. 15 and 16 disclose a valve clearance regulating means that decreases the effective length of the valve operating linkage members, when the operating force is being applied, on the same theories that were advanced in explaining the forms of the invention in Figs. 1 and 11 of the drawings and a valve clearance regulating means that takes up any existing slack by increasing the effective length of the valve operating linkage members during the non-operating portions of the cycle of valve movement by the restoring force in the tension of the torsional spring 238.

It should be readily apparent that the plane of rotation of cam 234 need not be parallel to the axis of rotation or oscillation of rocker arm 229 but may be inclined therewith in the manner shown in Fig. 7.

It should now be readily apparent that each of the three basic forms of the invention disclosed in Figs. 1, 11 and 15 and the modifications thereof provide a self-contained mechanical type valve clearance regulator that has only a small number of parts, that can be placed in an easily accessible place in an internal combustion engine for servicing, that does not require precision tolerances or selective assembly in its manufacture, and that can work in any position. A positive shortening in the effective length of the valve operating linkage occurs during each valve operating cycle. This shortening, caused by the resultant force acting on the cam at the point of contact, is independent of the cam self-locking angle and of critical coefficients of friction, especially the coefficient of friction between the cam and the pin or shaft-like portion mounting it for rotation. The cam in each form is always free to rotate when the proper resultant forces act and operation is not dependent on the friction caused by this last mentioned coefficient of friction locking the cam against rotation.

Various changes in details and arrangement of parts can be made by one skilled in the art without departing from the spirit of this invention or the scope of the appended claims.

What I claim is:

1. In a valve operating mechanism, a valve head having a spring normally biasing it toward closed position; a movable cam; a mechanical movement connecting said cam and valve head with said mechanical movement including two members arranged for contacting movement, said cam arranged for intermittently applying an operating force to said mechanical movement to open said valve head after which opening said valve spring applies an operating force to said mechanical movement during valve head closing so that either member actuates the other, said cam also having a dwell in the cycle of valve movement wherein said operating force is not applied to said mechanical movement; means for regulating the clearance between said members including a means for decreasing the effective length of said members when force is applied and including means for taking up any existing slack by increasing the effective length of said members during the non-operating portions of the cycle of movement; said means for decreasing the effective length including in the first of said members a substantially self-locking cam rotatably secured to the remainder of said first member for rotation around an axis while having its cam surface contacting the second of said members for forming the contact between said members, said cam surface being constructed so that rotation of the substantially self-locking cam in one direction increases the cam surface radial length from said axis for increasing the distance between said axis and said contact while rotation in the other direction will decrease said radial length for decreasing said distance, said cam surface having at all times a small angle of slope for substantially self-locking so that it will not rotate about its axis under only the normal operating force, and means for causing a force to be exerted on the cam surface of said substantially self-locking cam only at said contact point by said second member during the application of said operating force for causing said substantially self-locking cam to rotate in said other direction for decreasing said radial length so that the effective length of said members is decreased; and said means for taking up any existing slack during the non-operating portions of the cycle of movement comprising means urging said substantially self-locking cam to rotate in said one direction for increasing the radial length during the non-operating portions of the cycle of movement for taking up any existing slack.

2. In a mechanical movement, the combination of at least two members arranged for contacting movement; means for intermittently and smoothly applying operating force to said movement to cause either member to actuate the other and to keep the members always in contact; means for regulating the clearance between said members including a means for decreasing the effective length of said members when said operating force is applied and including means for taking up any existing slack by increasing the effective length of said members during the non-operating portions of the cycle of movement; said means for decreasing the effective length including in the first of said members a substantially self-locking cam rotatably secured to the remainder of said first member for rotation around an axis while having its cam surface contacting the second of said members for forming the contact between said members, said cam being rotatably secured at all times in free-to-rotate condition during the application of said operating forces, said cam surface being constructed so that rotation of the cam in one direction increases the cam surface radial length from said axis for increasing the distance between said axis and said contact while rotation in the other direction will decrease said radial length for decreasing said distance, said cam surface having at all times a small angle of slope for substantially self-locking so that it will not rotate about its axis under only the normal operating force, and means for causing a force to be exerted on the cam surface of said cam at said contact point by said second member during the application of said operating force for causing said cam to rotate in said other direction for decreasing said radial length so that the effective length of said members is decreased; and said means for taking up any existing slack during the non-operating portions of the cycle of movement comprising means urging said cam to rotate in said one direction for increasing the radial length during the non-operating portions of the cycle of movement for taking up any existing slack.

3. In a valve clearance regulator for a valve operating linkage, the combination of a rocker arm for rotatable mounting, a cam rotatively mounted on said rocker arm for rotation about an axis, said cam adapted to contact another member in said linkage so that oscillation of said rocker arm will open and close said valve, said cam being rotatable in one direction to increase the distance between its axis of rotation and the contact point and being rotatable in the opposite direction to shorten the distance, said cam being resiliently biased to urge said cam in said first direction to take up undesirable clearance, said cam being maintained free to rotate during the full duration of the valve opening and closing movement for shortening of the valve linkage during any part of said valve operating movement when the force at the point of contact of the cam and said other member become active to urge said cam to rotate in said opposite direction for shortening.

4. In a mechanical movement, the combination of at least two members arranged for contacting movement; means for intermittently applying operating force to said movement to cause either member to actuate the other; means for regulating the clearance between said members including a means for decreasing the effective length of said members when said operating force is applied and including means for taking up any existing slack by increasing the effective length of said members during the non-operating portions of the cycle of movement; said means for decreasing the effective length including in the first of said members a rocker arm mountable for rotation about an axis and a substantially self-locking cam rotatably secured to one end of said rocker arm for rotation around an axis while having its cam surface contacting the second of said members for forming the contact between said members, said cam surface being constructed so that rotation of the cam in one direction increases the cam surface radial length from said axis for increasing the distance between said axis and said contact while rotation in the other direction will decrease said radial length for decreasing said distance, said cam surface having at all times a small angle of slope for substantially self-locking so that it will not rotate about its axis under only the normal operating force, and means for causing a force to be exerted on the cam surface of said cam only at said contact point by said second member during the application of said operating force for causing said cam to rotate in said other direction for decreasing said radial length so that the effective length of said members is decreased; and said means for taking up any existing slack during the non-operating portions of the cycle of movement comprising means urging said cam to rotate in said one direction for increasing the radial length during the non-operating portions of the cycle of movement for taking up any existing slack.

5. In a mechanical movement, the combination of at least two members arranged for contacting movement; means for intermittently applying operating force to said movement to cause either member to actuate the other; means for regulating the clearance between said members including a means for decreasing the effective length of said members when said operating force is applied and including means for taking up any existing slack by increasing the effective length of said members during the non-operating portions of the cycle of movement; said means for decreasing the effective length including in the first of said members a substantially self-locking cam rotatably secured to the remainder of said first member for rotation around an axis while having its cam surface contacting the second of said members for forming the contact between said members, said cam surface being constructed so that rotation of the cam in one direction increases the cam surface radial length from said axis for increasing the distance between said axis and said contact while rotation in the other direction will decrease said radial length for decreasing said distance, said cam surface having at all times a small angle of slope for substantially self-locking so that it will not rotate about its axis under only the normal operating force, and means for causing a force to be exerted on the cam surface of said cam at said contact point by said second member during the application of said operating force for causing said cam to rotate in said other direction for decreasing said radial length so that the effective length of said members is decreased; and said means for taking up any existing slack during the non-operating portions of the cycle of movement comprising means urging said cam to rotate in said one direction for increasing the radial length during the non-operating portions of the cycle of movement for taking up any existing slack.

6. A mechanical movement, as set forth in claim 5, wherein said means for causing a force to be exerted on said cam surface includes means causing at least half the total decrease in effective length while said cam of said first member is exerting a force to actuate said second member.

7. In a valve operating mechanism with a clearance regulator for an internal combustion engine, a rocker arm having means for pivotally mounting it to said engine for rotation about an axis, a cam rotatably secured to one end of said rocker arm for rotation about an axis with the plane of rotation of said cam extending parallel to said rocker arm rotatable mounting axis, said cam having a cam surface for eccentric contact engagement with a valve operating member, said cam surface having at all times a small angle of slope at said contact for substantially self-locking so that it will not rotate about its axis under only the normal operating force, said cam surface increasing its radial length between said axis and contact point when rotated in one direction and decreasing its radial length when rotated in the opposite direction, and resilient means on said arm normally urging said cam to rotate in said one direction.

8. In a valve operating mechanism with a clearance regulator for an internal combustion engine, a rocker arm having means for pivotally mounting it to said engine for rotation about an axis, a cam rotatably secured to one end of said rocker arm for rotation about an axis non-parallel with said rocker arm rotatable mounting axis, said cam having a cam surface for eccentric contact engagement with a valve operating member, said cam surface having at all times a small angle of slope at said contact for substantially self-locking so that it will not rotate about its axis under only the normal operating force, said cam surface increasing its radial length between said axis and contact point when rotated in one direction and decreasing its radial length when rotated in the opposite direction, and resilient means on said arm normally urging said cam to rotate in said one direction.

9. A mechanical movement, as set forth in claim 5, wherein said means for causing said force to be exerted on said cam surface includes an eccentricity between said cam contact and axis of rotation urging said cam to rotate in said other direction, includes the arrangement of said members so that common contacting points on said members move along intersecting paths, and includes said cam rotatable axis arranged to intersect at an angle greater than 0° a generating surface with its surface being continuously extended infinitely in all directions, wherein said generated surface extends perpendicular to a plane formed by the intersecting paths of travel of any two common contacting points on said members with said generated surface including the plane locating contact line of travel of one of said members.

10. A mechanical movement, as set forth in claim 5, wherein said means for causing said force to be exerted on said cam surface includes an eccentricity between said cam contact and axis of rotation urging said cam to rotate in said other direction, includes the arrangement of said members so that common contacting points on said members move along intersecting paths and includes said cam rotatable axis forming an angle between 0° and 85° with the plane formed by the intersecting paths of travel of any two common contacting points on said members.

11. A mechanical movement, as set forth in claim 5, wherein said means for causing said force to be exerted on said cam surface includes an eccentricity between said cam contact and axis of rotation urging said cam to rotate in said other direction, includes the arrangement of said members so that common contacting points on said members move along intersecting paths and includes said cam rotatable axis forming an angle with the plane formed by the intersecting paths of travel of any two common contacting points on said members of between 0° and 90° but sufficiently less than 90° to cause movement of the contact point between the members during the application of said operating forces to move over the cam surface with a component of movement in the axial direction of said cam for causing said cam to rotate in said other direction to provide sufficient reduction in the effective length of said members.

12. A mechanical movement, as set forth in claim 4, wherein said means for causing said force to be exerted on said cam surface includes an eccentricity between said cam contact and axis of rotation urging said cam to rotate in said other direction, includes the arrangement of said members so that common contacting points on said members move along intersecting paths and includes an angle between 0° and 85° between said rocker arm rotatable mounting axis and the plane of rotation of said cam about its axis.

13. A mechanical movement, as set forth in claim 4, wherein said means for causing said force to be exerted on said cam surface includes an eccentricity between said cam contact and axis of rotation urging said cam to rotate in said other direction, includes the arrangement of said members so that common contacting points on said members move along intersecting paths and includes an acute angle less than 85° between said rocker arm rotatable mounting axis and the plane of rotation of said cam about its axis.

14. A mechanical movement, as set forth in claim 4, wherein said means for causing said force to be exerted on said cam surface includes an eccentricity between said cam contact and axis of rotation urging said cam to rotate in said other direction, includes the arrangement of said members so that common contacting points on said members move along intersecting paths and includes said rocker arm rotatable mounting axis being parallel with the plane of rotation of said cam about its axis.

15. A mechanical movement, as set forth in claim 5, wherein said means for causing said force to be exerted on said cam surface including the arrangement of said members so that common contacting points on said members move along intersecting paths with one of said paths being of arcuate form, the path of contact on one of said members being arcuate in shape while the path of contact on the other of said members being straight.

16. A mechanical movement, as set forth in claim 5, wherein said means for causing said force to be exerted on said cam surface including the arrangement of said members so that common contacting points on said members move along intersecting paths with the path of the points on said first member being of arcuate form, the path of contact on said first member being arcuate in shape while the path of contact on said second member being straight.

17. A mechanical movement, as set forth in claim 5, wherein said means for causing said force to be exerted on said cam surface including the arrangement of said members so that common contacting points on said members move along intersecting paths with the path of the points on said first member being of arcuate form, the path of contact on said second member being arcuate in shape while the path of contact on said first member being straight.

18. A valve clearance regulator, comprising a mechanical movement, the combination of at least two members arranged for contacting movement; means for intermittently applying operating force to cause either member to actuate the other; means for regulating the clearance between said members including a means for decreasing the effective length of said members when said operating force is applied and including means for taking up any existing slack by increasing the effective length of said members during the non-operating portions of the cycle of movement; said means for regulating the clearance including on one of said members an element that forms said contact with the other member, said element being movable in one direction to increase the effective length and being movable in the other direction to decrease said effective length, rotator means for moving said element in said other direction when said operating forces are applied, and means normally biasing said element to move in said one direction during the non-operating portions of the cycle.

19. In a mechanical movement, as set forth in claim 5, wherein said means for causing said force to be exerted on said cam surface includes a rotator means for rotating said second member about an axis during at least a portion of the time while the operating force is being applied, said cam surface contacting said second member a sufficient distance from said axis of rotation of said second member during the rotating action so that said rotator means rotates said cam in said other direction for decreasing the radial length of said cam for causing sufficient decrease in the effective length of said members.

20. A valve clearance regulator including a mechanical movement, as set forth in claim 5, for opening the valve, wherein said second member is the stem of said valve; said means for causing said force to be exerted on said cam surface includes a valve rotator means for rotating said valve stem about its longitudinal axis during at least a portion of the time while the operating force is being applied, said cam surface contacting the end of said valve stem a sufficient distance from said axis of rotation of said valve stem during the rotating action so that said valve rotator means rotates said cam in said other direction for decreasing the radial length of said cam for causing sufficient decrease in the effective length of said members.

21. A valve clearance regulator, as set forth in claim 20, wherein said contacting end of said valve stem is flat while said cam surface is rounded.

22. A valve clearance regulator including a mechanical movement, as set forth in claim 5, for opening the valve, wherein said second member is the stem of said valve; said means for causing said force to be exerted on said cam surface includes a valve rotator means for rotating said valve stem about its longitudinal axis during opening of said valve while the operating force is being applied, said cam surface contacting the end of said valve stem a sufficient distance from said axis of rotation of said valve stem during the rotating action so that said valve rotator means rotates said cam in said other direction for decreasing the radial length of said cam for causing sufficient decrease in the effective length of said members.

23. A valve clearance regulator, as set forth in claim 22, wherein said contacting end of said valve stem is rounded while said cam surface is straight in the generally extending axial direction.

24. In a mechanical movement, as set forth in claim 4, wherein said means for causing said force to be exerted on said cam surface includes a rotator means for rotating said second member about an axis during at least a portion of the time while the operating force is being applied, said cam surface contacting said second member a sufficient distance from said axis of rotation of said second member during the rotating action so that said rotator means rotates said cam in said other direction for decreasing the radial length of said cam for causing sufficient decrease in the effective length of said members, the rotational axis of said cam being parallel with said rocker arm rotational axis.

25. In a mechanical movement, as set forth in claim 4, wherein said means for causing said force to be exerted on said cam surface includes a valve rotator means for rotating said second of said members about an axis during at least a portion of the time while the operating force is being applied, said cam surface contacting said second member a sufficient distance from said axis of rotation of said second member during the rotating action so that said rotator means rotates said cam in said other direction for decreasing the radial length of said cam for causing sufficient decrease in the effective length of said members, the rotational axis of said cam being non-parallel with said rocker arm rotational axis.

26. In a mechanical movement, as set forth in claim 4, wherein said means for causing said force to be exerted on said cam surface includes a rotator means for rotating said second of said members about an axis during at least a portion of the time while the operating force is being applied, said cam surface contacting said second member a sufficient distance from said axis of rotation of said second member during the rotating action so that said rotator means rotates said cam in said other direction for decreasing the radial length of said cam for causing sufficient decrease in the effective length of said members, the plane of rotation of said cam extending parallel to said rocker arm rotational axis.

27. A mechanical movement, as set forth in claim 5, wherein said means for causing said force to be exerted on said cam surface includes an eccentricity between said cam contact and axis of rotation urging said cam to rotate in said other direction, includes the arrangement of said members so that common contacting points on said members move along intersecting paths, includes said cam rotatable axis arranged to intersect at an angle greater than 0° a generating surface with its surface being continuously extended infinitely in all directions, wherein said generated surface extends perpendicular to a plane formed by the intersecting paths of travel of any two common contacting points on said members with said generated surface including the plane locating contact line of travel of one of said members, includes a rotator means for rotating said second member about an axis during at least a portion of the time while the operating force is being applied, and includes said cam surface contacting said second member a sufficient distance from said axis of rotation of said second member during the rotating action so that said rotator means rotates said cam in said other direction for decreasing the radial length of said cam for causing at least a portion of the decrease in the effective length of said members.

28. A valve clearance regulator including a mechanical movement, as set forth in claim 5, for opening the valve, wherein said second member is the stem of said valve; said means for causing said force to be exerted on said cam surface includes a valve rotator means for rotating said valve stem about its longitudinal axis during at least a portion of the time while the operating force is being applied, includes said cam surface contacting the end of said valve stem a sufficient distance from said axis of rotation of said valve stem during the rotating action so that said valve rotator means rotates said cam in said other direction for decreasing the radial length of said cam for causing at least a portion of the reduction in the effective length of said members, includes the arrangement of said members so that common contacting points on said members move along intersecting paths, includes an eccentricity between said cam contact and axis of rotation urging said cam to rotate in said other direction, and includes said cam rotatable axis forming an angle with the plane formed by the intersecting paths of travel of any two common contacting points on said members of between 0° and 90° but sufficently less than 90° to cause movement of the contact point between the members during the application of said operating forces to move over the cam surface with a component of movement in the axial direction of said cam for causing said cam to rotate in said other direction to provide the remaining portion of the reduction in the effective length of said members.

29. A valve clearance regulator including a mechanical movement, as set forth in claim 5, for opening the valve, wherein said second member is the stem of said valve; said means for causing said force to be exerted on said cam surface includes a valve rotator means for rotating said valve stem about its longitudinal axis during opening of said valve while the operating force is being applied, includes said cam surface contacting the end of said valve stem a sufficient distance from said axis of rotation of said valve stem during the rotating action so that said valve rotator means rotates said cam in said other direction for decreasing the radial length of said cam for causing at least a portion of the decrease in the effective length of said members, includes the arrangement of said members so that common contacting points on said members move along intersecting paths, includes an eccentricity between said cam contact and axis of rotation urging said cam to rotate in said other direction, and includes said cam rotatable axis forming an angle between 0° and 85° with the plane formed by the intersecting paths of travel of any two common contact points on said members.

30. A valve clearance regulator including a mechanical movement, as set forth in claim 4, for opening the valve, wherein said second member is the stem of said valve; said means for causing said force to be exerted on said cam surface includes a valve rotator means for rotating said valve stem about its longitudinal axis during at least a portion of the time while the operating force is being applied, includes said cam surface contacting the end of said valve stem a sufficient distance from said axis of rotation of said valve stem during the rotating action so that said valve rotator means rotates said cam in said other direction for decreasing the radial length of said cam for causing at least a portion of the decrease in the effective length of said members, includes the arrangement of said members so that common contacting points on said members move along intersecting paths, includes an eccentricity between said cam contact and axis of rotation urging said cam to rotate in said other direction, and includes said rocker arm rotatable mounting axis being parallel with the plane of rotation of said cam about its axis.

31. A mechanical movement, as set forth in claim 5, wherein said means for causing said force to be exerted on said cam surface includes means causing effective shortening during application of the intermittently applied operating force in either direction.

32. A mechanical movement, as set forth in claim 5, wherein said means for causing said force to be exerted on said cam surface includes means causing said cam surface and second member to slide relative to each other at said contact point during the full time of application of the intermittently applied operating force in either direction.

33. In a valve operating mechanism with a clearance regulator for an internal combustion engine, a rocker arm having means for pivotally mounting it to said engine for oscillation about an axis in opposite directions, a cam rotatably secured to one end of said rocker arm for rotation about an axis non-parallel with said rocker arm rotatable mounting axis, said cam having a cam surface for eccentric contact engagement with a valve operating member, said cam surface having at all times a small angle of slope at said contact for substantially self-locking so that it will not rotate about its axis under only the normal operating force, said cam surface increasing its radial length between said axis and contact point when rotated in one direction and decreasing its radial length when rotated in the opposite direction, said cam being mounted on said rocker arm for free rotation and for relative sliding action at said contact engagement with said valve operating member during rocker arm oscillation in either direction so that the resultant force acting on the cam surface at said contact engagement rotates said cam in said opposite direction for effective shortening, and resilient means on said arm normally urging said cam to rotate in said one direction.

34. In a valve operating mechanism, as set forth in claim 33, wherein the plane of rotation of said cam extends parallel to the rocker arm oscillation axis.

35. A mechanical movement, as set forth in claim 5, wherein said means for causing a force to be exerted on said cam surface includes the arrangement of said members so that a rubbing action occurs at said contact point in a plane intersecting the plane of rotation of said cam.

36. A mechanical mechanism adapted to operate an internal combustion engine valve head, said mechanism including two parts, an element, means operatively connecting said element by one of its surfaces to one of said parts to provide a mechanism shortening action by movement in one direction and a lengthening action in an opposite direction, means operatively connecting said parts together for relative movement with said element in frictional contact on another of its surfaces with said other part, means for intermittently applying operating force to said mechanism to cause intermittent relative sliding movement of said parts in another direction by sliding contact at said other surface, said first and other directions being angularly disposed whereby relative movement in said other direction causes shortening movement in said one direction, said other surface being a cam surface normally self-locking with said other part as long as relative movement between the parts does not occur.

37. A mechanical mechanism adapted to operate an internal combustion engine valve head, said mechanism including two members arranged for frictional contacting relative movement at first surfaces in a first direction, means for intermittently applying operating force to said mechanism to cause intermittent relative movement of said members in said first direction, said members including means for regulating the clearance between said members in said mechanism, said clearance regulating means including means for decreasing the effective length of the mechanism when said relative movement occurs without collapse of said effective length, said regulating decreasing means including an element forming part of one of said members and including means operatively connecting said element at a second surface to the remainder of said last mentioned member for movement in a second direction relative to the other of said members along said first surfaces for decreasing said effective length, means for operatively connecting said members with said first and second directions being angularly disposed so that decrease of said length will automatically occur in response to said rubbing action, said first surfaces include a cam surface on said element.

38. A mechanical mechanism adapted to operate an internal combustion engine valve head, said mechanism including two members arranged for frictional contacting relative movement at first surfaces in a first direction, means for intermittently applying operating force to said mechanism to cause intermittent relative movement of said members in said first direction, said member including means for regulating the clearance between said members in said mechanism, said clearance regulating means including means for decreasing the effective length of the mechanism when said relative movement occurs without collapse of said effective length and including means for taking up any existing slack, said regulating decreasing means including an element forming part of one of said members and including means operatively connecting said element at a second surface to the remainder of said last mentioned member for movement in a second direction relative to the other of said members along said first surfaces for decreasing said effective length and in a third direction opposite to said second direction for increasing said effective length to take up any slack, means for urging said element in said third direction, means for operatively connecting said members with said first and second directions being angularly disposed so that decrease of said length will automatically occur in response to said rubbing action, said first surfaces include a cam surface on said element.

39. A mechanical mechanism adapted to operate an internal combustion engine valve head, said mechanism including two members arranged for frictional contacting relative movement at first surfaces in a first direction, means for intermittently applying operating force to said mechanism to cause intermittent relative movement of said members in said first direction, said members including means for regulating the clearance between said members in said mechanism, said clearance regulating means including means for decreasing the effective length of the mechanism when said relative movement occurs without collapse of said effective length and including means for taking up any existing slack, said regulating decreasing means including an element forming part of one of said members and including means rotatably connecting said element at a second surface to the remainder of said last mentioned member for movement in a second direction relative to the other of said members along said first surface for decreasing said effective length and in a third direction opposite to said second direction for increasing said effective length to take up any slack, means for urging said element in said third direction, means for operatively connecting said members with said first and second directions being angularly disposed so that decrease of said length will automatically occur in response to said rubbing action, said first surfaces include a cam surface on said element.

40. A mechanical mechanism adapted to operate an internal combustion engine valve head, said mechanism including two members arranged for frictional contacting relative movement at first surfaces in a first direction, means for intermittently applying operating force to said mechanism to cause intermittent relative movement of said members in said first direction, said members including means for regulating the clearance between said members in said mechanism, said clearance regulating means including means for decreasing the effective length of the mechanism when said relative movement occurs without collapse of said effective length and including means for taking up any existing slack, said regulating decreasing means including an element forming part of one of said members and including means rotatably connecting said element at a second surface to the remainder of said last mentioned member for movement in a second direction relative to the other of said members along said first surfaces for decreasing said effective length and in a third direction opposite to said second direction for increasing said effective length to take up any slack, resilient means for biasing said element in said third direction, means for operatively connecting said members with said first and second directions being right angularly disposed so that decrease of said length will automatically occur in response to said rubbing action, said first surfaces include a cam surface on said element.

References Cited in the file of this patent

UNITED STATES PATENTS

| | | |
|---|---|---|
| 1,840,314 | Gerard | Jan. 12, 1932 |
| 1,950,590 | Berry | Mar. 13, 1934 |
| 2,365,401 | Fisk | Dec. 19, 1944 |